United States Patent [19]
Norris et al.

[11] Patent Number: 5,621,191
[45] Date of Patent: Apr. 15, 1997

[54] CABLE GLAND

[75] Inventors: Trevor W. Norris, Ashton-under-Lyne; Lee Shortman, Oldham, both of England

[73] Assignee: Hawke Cable Glands Limited, Walsall, England

[21] Appl. No.: 215,645

[22] Filed: Mar. 22, 1994

[30] Foreign Application Priority Data

Mar. 27, 1993 [GB] United Kingdom ............... 9306437

[51] Int. Cl.⁶ .................................................. H02G 3/18
[52] U.S. Cl. ................................................ 174/65 SS
[58] Field of Search ......................... 174/65 SS; 285/158

[56] References Cited

U.S. PATENT DOCUMENTS

| | | | |
|---|---|---|---|
| 3,663,740 | 5/1972 | Dellett | 174/92 |
| 4,629,825 | 12/1986 | Lackinger | 174/65 SS |
| 4,674,818 | 6/1987 | McMills et al. | 439/275 |
| 4,692,563 | 9/1987 | Lackinger | 174/65 SS |
| 4,857,015 | 8/1989 | Michaels et al. | 439/610 |
| 5,310,963 | 5/1994 | Kennelly | 174/65 SS |

FOREIGN PATENT DOCUMENTS

| | | |
|---|---|---|
| 0047188 | 3/1982 | European Pat. Off. . |
| 0144146 | 6/1985 | European Pat. Off. . |
| 0515200 | 11/1992 | European Pat. Off. . |
| 1327541 | 6/1962 | France . |
| 3028800 | 2/1982 | Germany . |
| 722002 | 1/1955 | United Kingdom . |
| 888381 | 1/1962 | United Kingdom . |
| 894270 | 4/1962 | United Kingdom . |
| 1163901 | 9/1969 | United Kingdom . |
| 1389846 | 4/1975 | United Kingdom . |
| 1537474 | 12/1978 | United Kingdom . |
| 2089586 | 6/1982 | United Kingdom . |
| 2149592 | 6/1985 | United Kingdom . |
| 2178909 | 2/1987 | United Kingdom . |
| 2204746 | 11/1988 | United Kingdom . |
| 2224894 | 5/1990 | United Kingdom . |
| 2241388 | 8/1991 | United Kingdom . |
| 2244388 | 11/1991 | United Kingdom . |
| 2247996 | 3/1992 | United Kingdom . |
| 2253530 | 9/1992 | United Kingdom . |
| 2256979 | 12/1992 | United Kingdom . |

*Primary Examiner*—Kristine L. Kincaid
*Assistant Examiner*—Dean A. Reichard
*Attorney, Agent, or Firm*—Larson And Taylor

[57] ABSTRACT

A hollow first gland part has a counterbore at one end to receive an end portion of a hollow second gland part that is axially located relative to the first gland part. A seal assembly is connected to the end portion of the second gland part for sealing engagement with a cable extending through the first and second gland parts. The seal assembly includes a diaphragm extending inwardly from an outer sleeve mounted on the end portion of the second gland part and an annular backplate for supporting the diaphragm. The diaphragm and backplate are both convergent away from the end portion of the second gland part so as to maintain sealing engagement of the diaphragm when a higher pressure exists on the side of the diaphragm remote from the end portion of the second gland part.

21 Claims, 5 Drawing Sheets

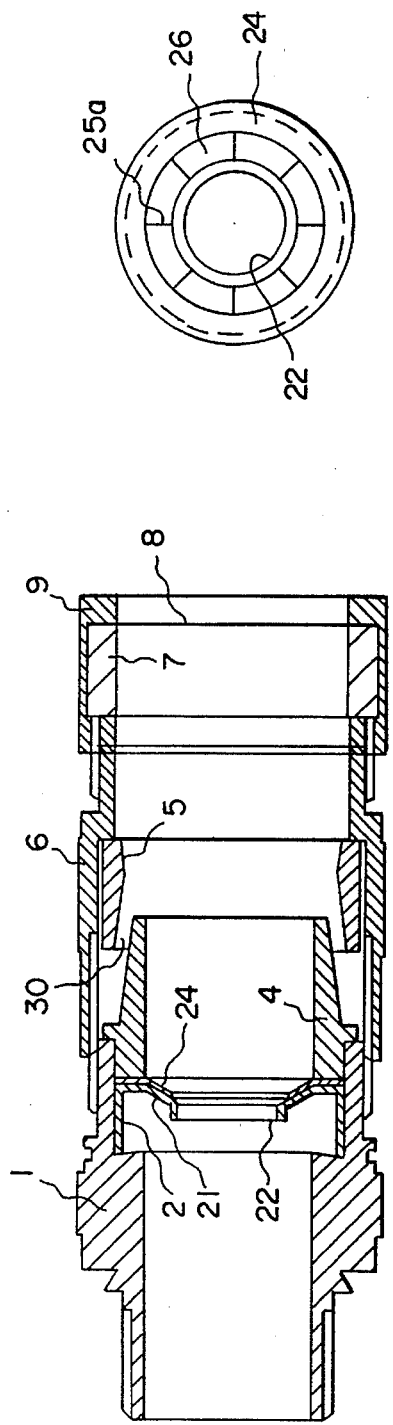
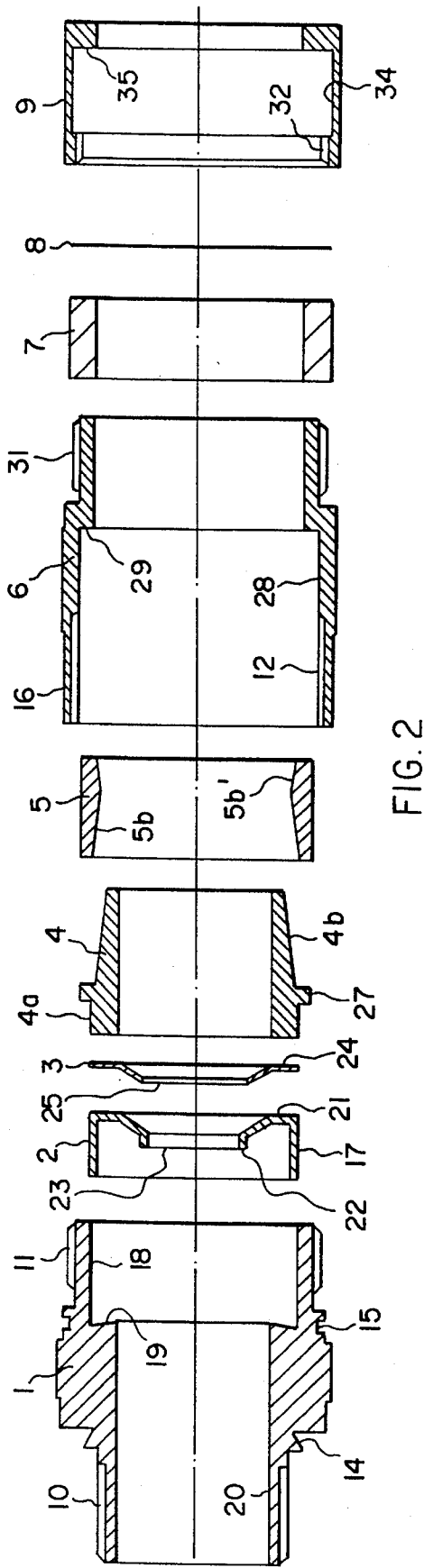

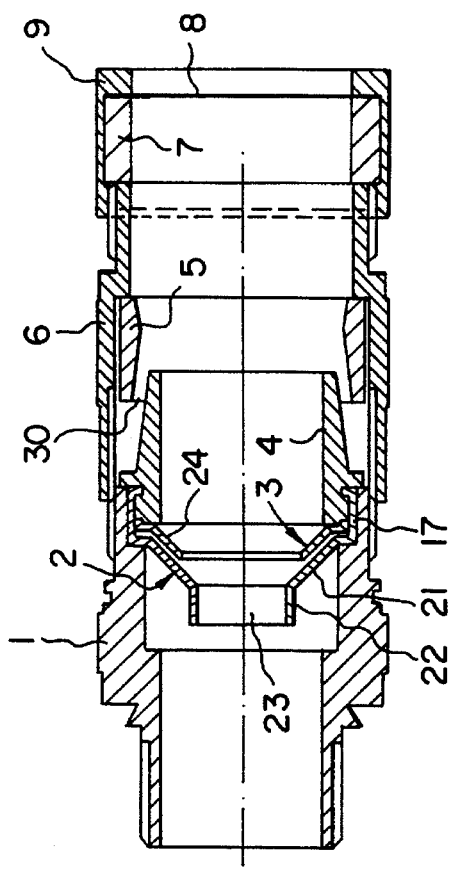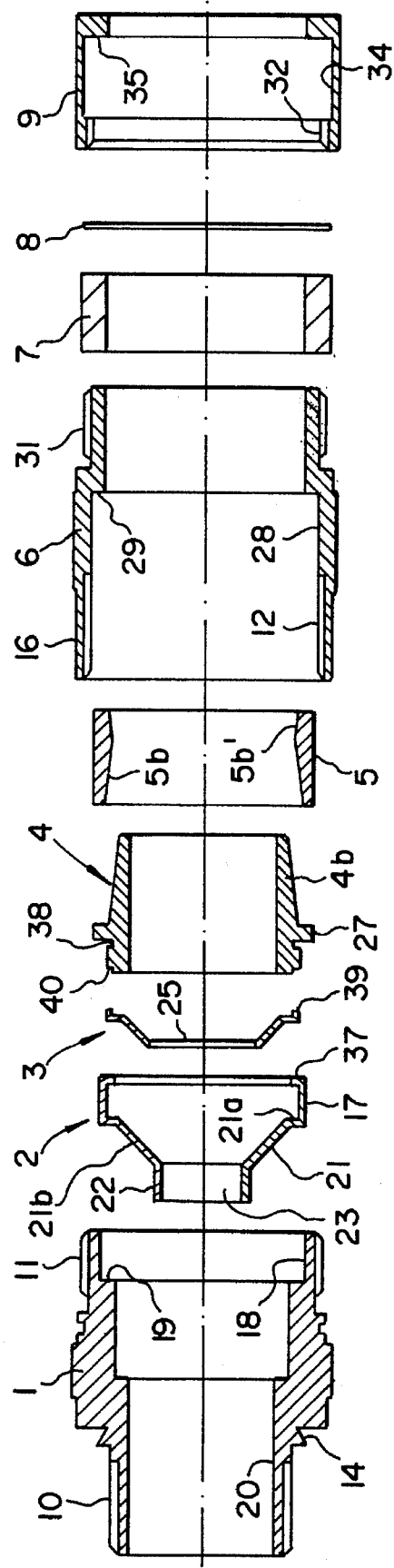

CABLE GLAND

BACKGROUND OF THE INVENTION

This invention relates to cable glands for connecting electric cables to junction boxes or other electrical fittings or equipment.

Cable glands are commonly employed to seal cable entries to junction boxes for increased safety, particularly in hazardous environments, and provide a flame-proof path to contain any explosion occurring within the junction box.

The known seals are generally of the compression type in which the seal is compressed radially onto the cable by relative rotation of two threadably engaged parts of the gland. The efficiency of such seals can be adversely affected if the gland parts are not fully engages and/or if the wrong size of seal is fitted.

It is an object of the present invention to provide a cable gland for electrical cables which does not rely on relative rotation of threadably engaged parts of the gland for sealing efficiency.

It is a further object of the invention to provide a cable gland capable of maintaining sealing efficiency at high pressures, for example under explosive conditions in hazardous environments.

SUMMARY OF THE INVENTION

According to the present invention there is provided a cable gland for electric cable comprising a gland body through which the cable extends, a seal received within the gland body, the seal having an inwardly extending portion arranged and adapted for sealing engagement with an outer surface of the cable, and the inwardly extending portion being provided with support means for maintaining the sealing engagement under increased pressure on one side of the seal.

By the provision of support means, the inwardly extending portion of the seal is prevented from reversing under increased pressure, for example following an explosion in a junction box or other fitting to which the gland is secured.

Advantageously, the inwardly extending portion comprises an apertured diaphragm arranged and adapted to seal around the cable.

Preferably, the diaphragm is inclined towards the exit end of the gland body. In this way insertion of the cable is facilitated and the aperture can conform resiliently to a range of cable sizes within specific limits.

The diaphragm aperture may extend axially for enhanced sealing with the outer surface of the cable. For example, the inner marginal edge of the diaphragm may terminate in an axially extending lip or sleeve.

Advantageously, the support means is of complementary shape to the diaphragm and has a central hole aligned with the diaphragm aperture through which the cable extends.

Preferably, the hole is of larger diameter than the diaphragm aperture in the undeformed state and is adapted to conform resiliently to the range of cable sizes, For example, the support means may have radial slits extending from the marginal edge of the hole to form flexible tongues.

The support means may be separate from or integral with the diaphragm. For example, the support means may be bonded to the diaphragm.

Preferably, the seal is made of elastomeric material and the support means is made of plastics. For example, the seal may be made of rubber or neoprene and the support means made of nylon or polyester.

Advantageously, the seal has a tubular body axially located between an internal abutment of the gland body and a tubular insert received in the gland body behind the support means.

Preferably, the insert is axially located relative to the gland body such that the seal body is substantially uncompressed in the axial direction in the assembled gland.

The diaphragm may be provided at the outer end of the seal body and the support means arranged externally behind the diaphragm.

Alternatively, the diaphragm may be provided at or towards the inner end of the seal body and the support means arranged internally behind the diaphragm.

The seal and internal support means may be mounted on the insert. For example, the seal body may be an interference fit on the insert or the seal body and insert may have co-operating interengageable formations for axially locating and retaining the seal body.

Advantageously, the internal support means and insert have cooperating formations for centering the support means relative to the diaphragm.

Preferably, the insert is retained by a gland nut threadably engageable with the gland body. The threaded connection may be covered by an external boot seal mounted on one of the gland body and nut and arranged to engage slidably and rotatably a cylindrical portion of the other of the gland body and nut.

Advantageously, the insert has an external taper surface projecting from the gland body for co-operating with an internal taper surface of a clamping ring to secure cable armour therebetween. The taper surfaces may be smooth or roughened, for example knurled.

Preferably, the clamping ring is reversible for presenting one of two oppositely inclined taper surfaces towards the external taper surface for accommodating different thicknesses of cable armour.

The invention will now be described in more detail by way of example only with reference to the accompanying drawings.

BRIEF DESCRIPTION OF THE DRAWINGS

FIG. 1 is a longitudinal section through a first embodiment of a cable gland according to the invention;

FIG. 2 is an exploded sectional view of the component parts of the gland shown in FIG. 1;

FIG. 4 is an end view of the seal and support plate shown in FIGS. 1, 2 and 3;

FIG. 5 is a longitudinal section through a second embodiment of a cable gland according to the invention;

FIG. 6 is an exploded sectional view of the component parts of the gland shown in FIG. 5;

DETAILED DESCRIPTION OF THE EXEMPLARY EMBODIMENTS OF THE INVENTION

Figure 3:
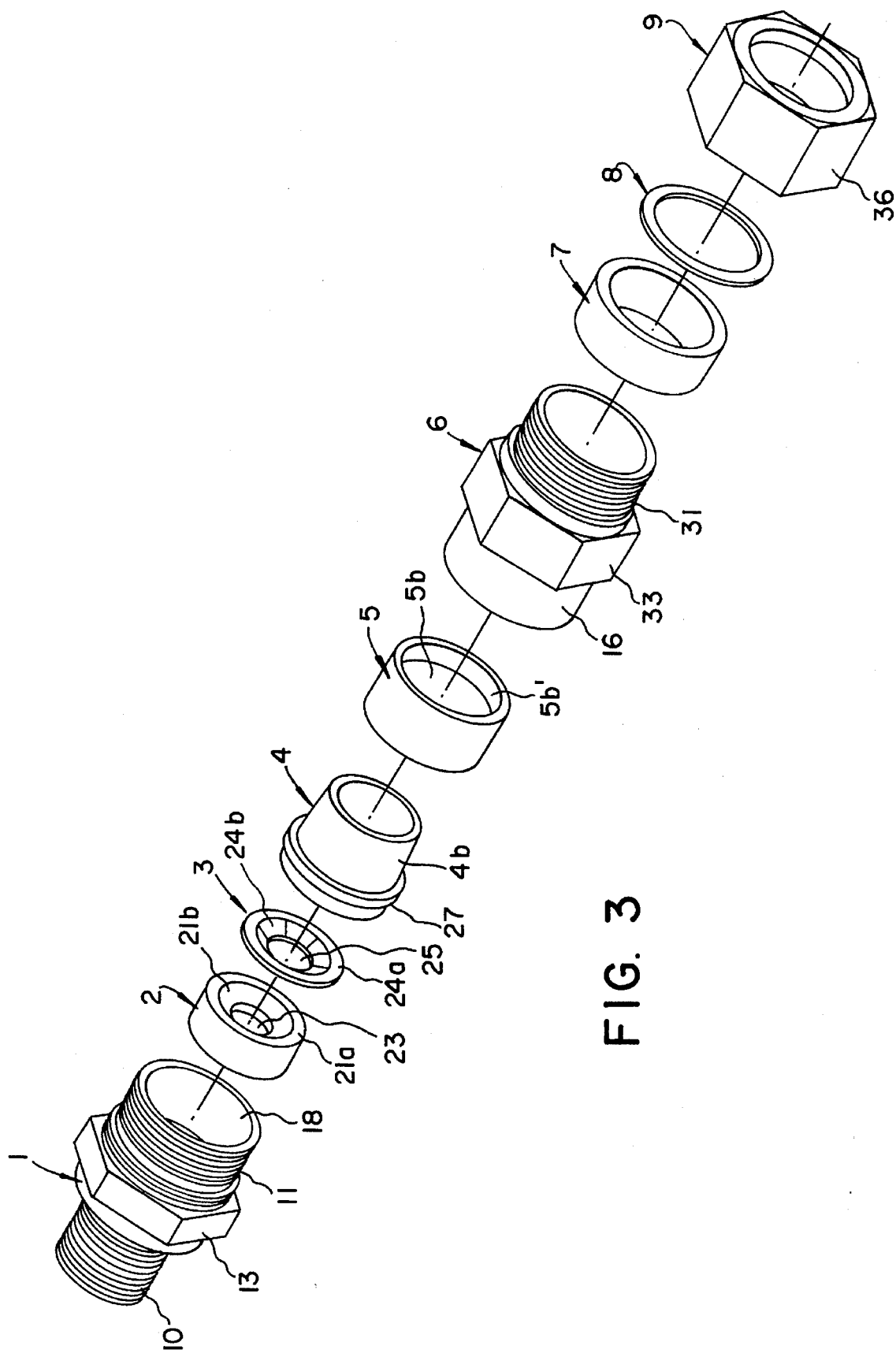
FIG. 3 is an exploded isometric view of the component parts of the cable gland shown in FIG. 1.

The component parts of the cable gland depicted in FIGS. 1 to 4 of the accompanying drawings comprise an entry adaptor 1, an annular seal 2, a seal support 3, a ferrule 4, a clamping ring 5, a compression nut 6, a further annular seal 7, a washer 8 and a back nut 9. All of these components are arranged and adapted to be co-axially assembled around an electric cable (not shown) of the type having metal armour disposed between an outer sheath of electrically insulating material and an inner sheath of electrically insulating material surrounding one or more conductors.

The adaptor 1 has external threads 10,11 of different diameter at each end for respective engagement with a complementary threaded hole (not shown) in a junction box or other electrical fitting and a complementary internal thread 12 at one end of the compression nut 6.

Between the external threads 10, 11 the adaptor 1 has an external hexagonal flange 13 for engagement by a spanner or like tool to rotate the adaptor 1 for assembly and installation of the gland. To one side of the flange 13 there is an annular notch 14 and to the other side a channel-section groove 15.

Figures 8, 9:
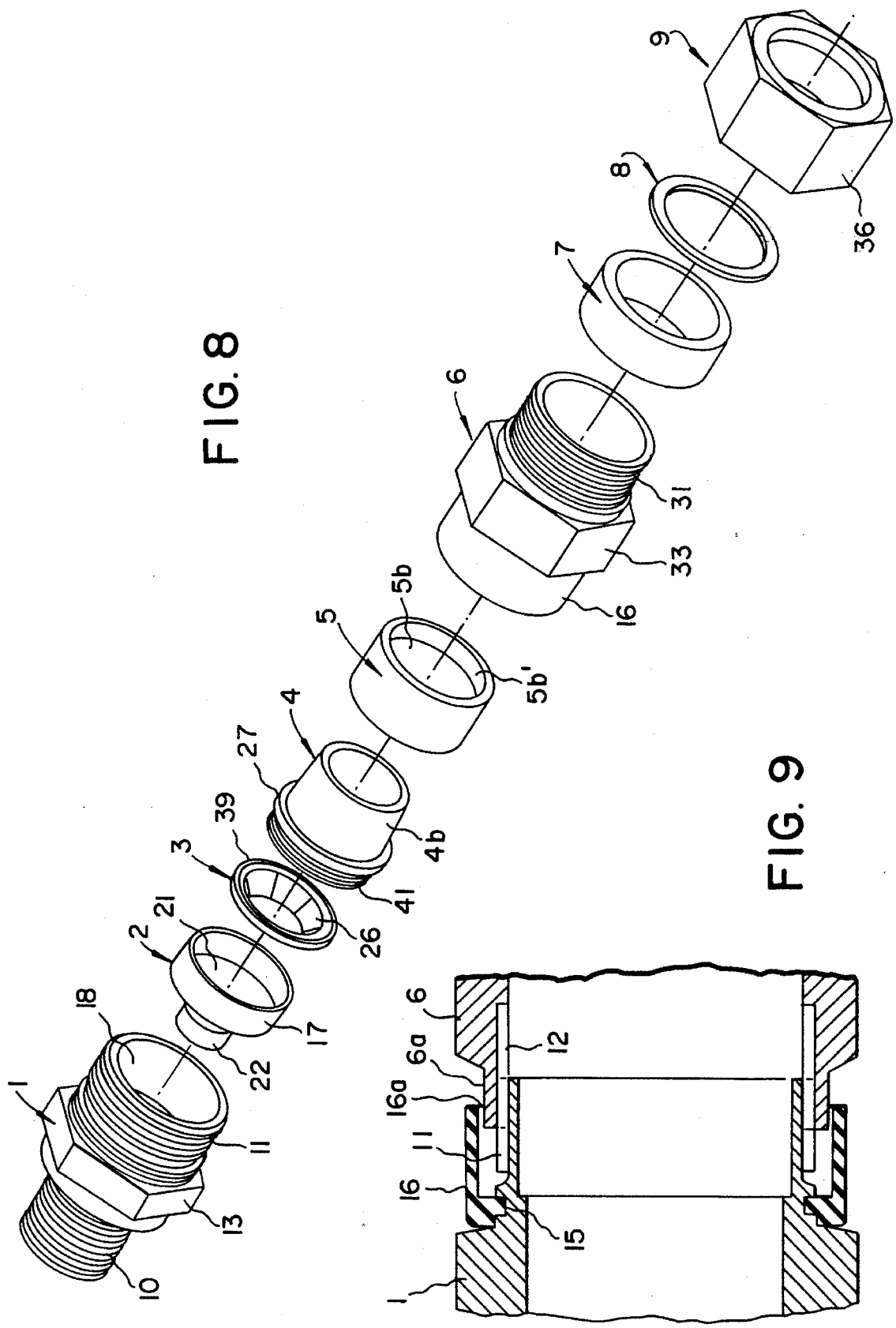
FIG. 8 is an exploded isometric view of the component parts a third embodiment of a cable gland according to the invention.
FIG. 9 is a longitudinal section of part of a cable gland according to the invention fitted with an external boot seal.

A seal (not shown) for sealing around the hole in the junction box is mounted in the notch 14 and, as shown in FIG. 9, a boot seal 16 is mounted in the groove 15 for sealing the threaded connection between the adaptor 1 and the compression nut 6. Both seals are made of resilient elastomeric material such as rubber, neoprene, silicone or the like.

The boot seal 16 extends with radial clearance over the external threads 11 of the adaptor 1 and terminates in an inwardly extending sealing lip 16a that engages rotatably and slidably a cylindrical outer surface 6a at the end of the compression nut 6.

The boot seal 16 provides a visual indication to the user when fitted and prevents ingress of water along the threads 11,12 thereby reducing the risk of corrosion of the cable armour. Furthermore, the boot seal 16 allows the gland to be taken apart for inspection of the cable armour and reassembled as required.

The annular seal 2 is made of elastomeric material such as neoprene or silicone and has a cylindrical body 17 that is a close tolerance fit in a counterbore 18 at the entry of the adaptor 1.

In the assembled gland, one end of the body 17 seats against a shoulder 19 at the inner end of the counterbore 18 leading to a coaxial bore 20 of smaller diameter at the exit end of the adaptor 1.

The other end of the body 17 has an inwardly extending diaphragm 21 terminating in an axially extending lip or sleeve 22 defining a central opening 23 coaxial with and of smaller diameter than the exit bore 20. An outer portion 21a of the diaphragm 21 extends radially and a frusto-conical inner portion 21b extends radially and axially towards the exit bore 20.

The seal support 3 is made of plastics such as nylon or polyester and comprises a plate 24 of complementary shape to the diaphragm 21 in the undeformed state with an outer portion 24a that is a close tolerance fit in the counterbore 18 and a frusto-conical inner portion 24b.

In the assembled gland, the support plate 24 is positioned behind the diaphragm 21 on the entry side and has a central hole 25 co-axial with and of slightly larger diameter than the diaphragm opening 23.

The inner frusto-conical portion 24b of the plate 24 is formed with radial slits 25a defining a plurality of resilient tongues 26 that can deflect to change the size of the hole 25 to accommodate cable inner sheaths of different diameter.

The ferrule 4 has a cylindrical outer surface 4a at one end that is a close tolerance fit in the counterbore 18 and the other end is tapered from an external collar 27 towards the free end to form an external clamping surface 4b of frusto-conical shape.

In the assembled gland, the seal 2 and support plate 24 are retained within the counterbore 18 by the ferrule 4 which engages the outer portion 24a of the plate 24 on the side remote from the seal 2 and is axially located by engagement of the collar 27 with the end of the entry adaptor 1 so that the seal 2 is substantially uncompressed.

The clamping ring 5 has a cylindrical external surface 5a that is a close tolerance fit in a counterbore 28 in the compression nut 6 and two internal clamping surfaces 5b,5b' of frusto-conical shape tapered towards opposite ends of the ring 5. The internal clamping surfaces 5b,5b' are of different axial length and are complementary to the external clamping surface 4b of the ferrule 4.

In the assembled gland, the ring 5 seats against a shoulder 29 at the inner end of the counterbore 28 with a selected one of the internal clamping surfaces 5b,5b' arranged to co-operate with the external clamping surface 4b of the ferrule to clamp the cable armour therebetween.

By reversing the ring 5, the size of an annular clearance gap 30 between the clamping surfaces of the ferrule 4 and ring 5 can be adjusted to accommodate a range of different thicknesses of cable armour within specific limits where previously a different pair of accurately sized clamping members has been required for each different thickness of cable armour.

The other end of the compression nut 6 has an external thread 31 for engagement with a complementary internal thread 32 at one end of the back nut 9.

Between the external cylindrical surface 6a and the external thread 31, the compression nut 6 has an external hexagonal flange 33 for engagement by a spanner or like tool to rotate the sleeve nut during assembly and installation of the gland to move axially the ring 5 towards the ferrule 4 to clamp the cable armour between the opposed clamping surfaces 5b or 5b' and 4b.

The back nut 9 has an internal annular recess 34 in which the seal 7 and washer 8 are located with the washer 8 seated against an internal shoulder 35 at the other end remote from the internal thread 32.

The seal 7 is made of elastomeric material such as neoprene or silicone and the back nut 9 has a hexagonal body 36 engageable by a spanner or like tool for rotating the back nut 9 during assembly and installation of the gland to compress the seal 7 axially and radially to bear against the outer cable sheath.

In use of the cable gland above-described to connect the cable to the junction box, the back nut 9 with the seal 7 and washer 8 assembled therein together with the compression nut 6 loosely engaged therewith are slid onto the end of the cable.

The clamping ring 5 is also slid over the end of the cable in the desired orientation for co-operating with the ferrule 4 and the outer sheath cut back to expose the cable armour and inner sheath.

The armour is then trimmed to the required length and the ferrule 4 slid over the inner sheath to position the armour between the opposed clamping surfaces 4b and 5b or 5b' of the ferrule 4 and ring 5.

The entry adaptor 1 with the seal 2 and support plate 24 assembled therein and the external boot mounted thereon is then slid over the inner sheath to receive the end of the ferrule 4 and loosely engaged with the compression nut 6.

The other end of the entry adaptor 1 is then presented to and secured in the junction box opening and the compression nut 6 and back nut 9 tightened to clamp the armour and seal the outer sheath.

The inner sheath is sealed by the lip 22 of diaphragm 21 which is supported on the entry side of the adaptor 1 by the support plate 24.

As a result, the sealing lip 22 is prevented from being blown back in the event of an explosion occurring within the junction box thereby ensuring the sealing integrity is maintained even at high pressures, for example up to 450 psi.

Also, relative rotation of the adaptor 1 and compression nut 6 does not cause the seal 2 to be compressed and the efficiency of the seal 2 is unaffected by the extent to which the compression nut 6 is tightened during assembly.

In addition, the seal 2 and support plate 24 can accommodate inner sheaths of different diameter within specific limits by resilient conformation of the diaphragm 21 and deflection of the tongues 26.

As a result, one seal 2 and plate 24 can be used for a given size of cable gland to accommodate a range of cable sizes where previously each cable size required an accurately sized seal with resultant problems of mismatching and inadequate sealing through fitting the wrong size of seal.

Figure 7:
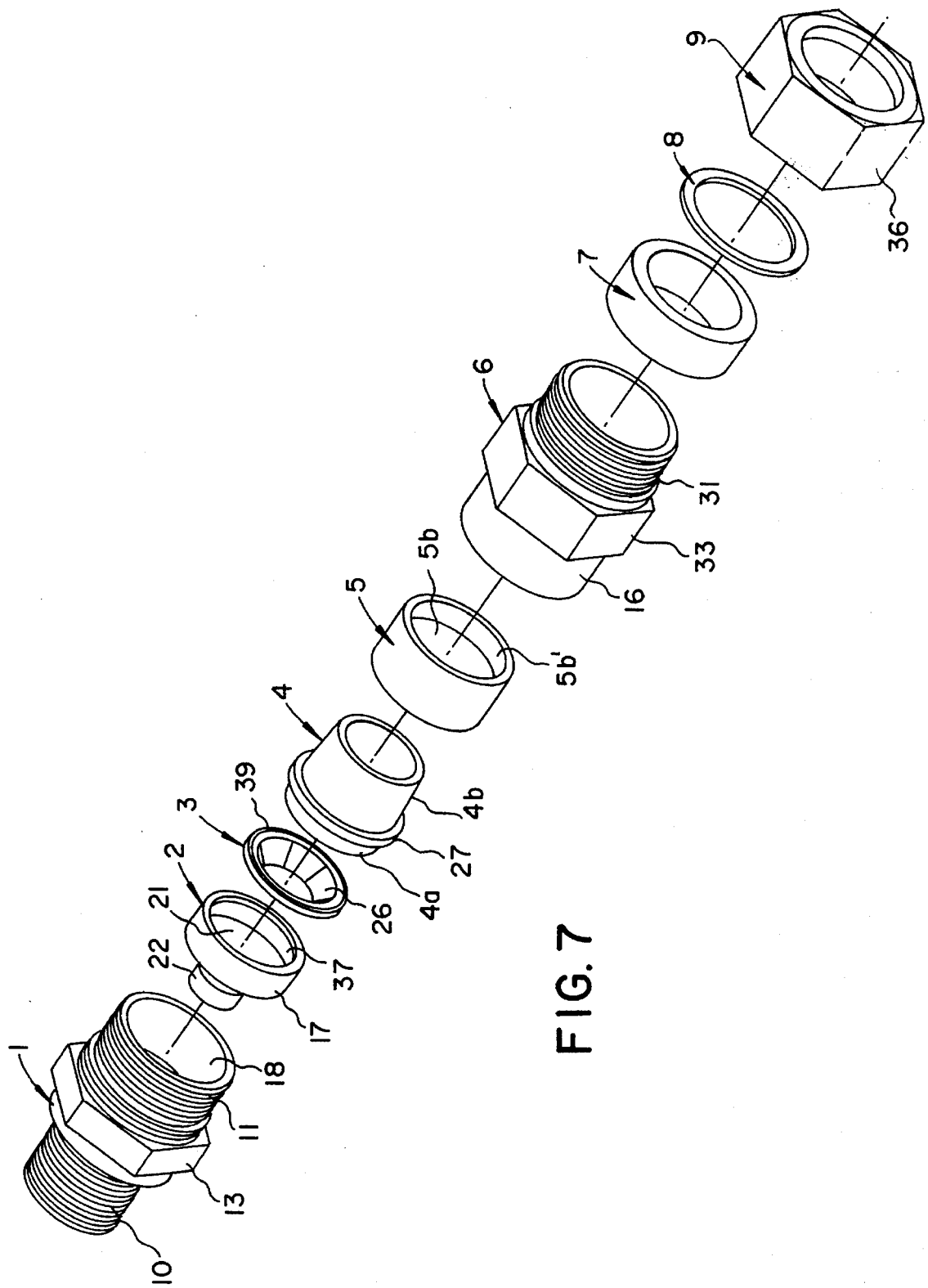
FIG. 7 is an exploded isometric view of the component parts of the cable gland shown in FIG. 5.

Referring now to FIGS. 5 to 7 of the accompanying drawings, a second embodiment of a cable gland similar to that in FIGS. 1 to 4 is shown in which like reference numerals are used to indicate corresponding parts.

In this second embodiment, the assembly of the seal 2 and support 3 is different in that the diaphragm 21 is provided at the inner end of the seal body 17 and the support plate 24 is positioned within the body 17 behind the diaphragm 21 on the entry side.

The other end of the body 17 remote from the diaphragm 21 is formed with an internal flange 37 that is received in an annular groove 38 formed in the outer surface 4a of the ferrule 4 adjacent to the collar 27 to locate and retain the seal 2 with the support plate 24 assembled therein.

The support plate 24 has a circumferentially extending axial projection 39 at the outer marginal edge that is received in a complementary annular recess 40 at the inner end of the ferrule 4 to centre the support plate 24 in the assembled gland.

In this way, the seal body 17 is internally supported within the counterbore 18 in the gland body 1 and the support plate 24 is accurately located relative to the diaphragm 21.

Referring now to FIG. 8 of the accompanying drawings, a third embodiment of a cable gland similar to that in FIGS. 5 to 7 is shown in which like reference numerals are used to indicate corresponding parts.

In this third embodiment, the seal 2 with support plate 24 assembled therein is located and retained by interference fit of the outer end of the seal body 17 on a circumferentially extending rib 41 on the outer surface 4a of the ferrule 4 such that the seal body 17 is radially compressed between the rib 41 and the inner surface of the counterbore 18 thereby improving sealing efficiency in the assembled gland.

In a modification, the seal body 17 may be provided with an annular witness mark on the inner surface to assist locating the rib 41. Alternatively, the rib 41 may be received in a complementary groove in the inner surface of the seal body 17 to locate and retain the seal 2 in similar manner to the second embodiment.

It will be understood that the invention is not limited to the embodiments above-described. For example, the seal and support plate may be provided in glands for armoured and unarmoured cable as will be familiar to those skilled in the art.

The diaphragm and support plate may be of any suitable size and shape although in general it is preferred that the support plate has a shape complementary to the diaphragm in the undeformed condition.

The support plate may be made of plastics, metal or any other suitable material and may be a separate part for assembly with the seal as described or an integral part of the seal. For example, the support plate may be bonded to the seal during or after formation of the seal. Thus, the seal is typically a moulding and the support plate may be positioned in the mould.

Finally, the term "cable" is used herein for convenience to include cables, wires, pipes, tubes and other elongate elements and the scope of the invention is to be construed accordingly.

We claim:

1. A cable gland comprising:

a hollow first gland part;

a hollow second gland part, said first and second gland parts being axially located relative to each other when the gland is assembled with a first end portion of said second gland part received in a receiving end of said first gland part, said first end portion having an axially disposed outer surface and a radially disposed end surface; and sealing means connected to said first end portion of said second gland part for sealing around a cable extending through said first and second gland parts, said sealing means including a seal and a seal support, said seal having
      an axially disposed outer sleeve mounted on said outer surface of said first end portion of said second gland part, and
      a diaphragm extending inwardly from said outer sleeve with said diaphragm converging away from said end surface of said first end portion of said second gland part for engagement with the cable;

wherein said seal support is arranged in axially located relationship to said end surface of said first end portion of said second gland part and converges away from said end surface of said first end portion of said second gland part to support said diaphragm of said seal for maintaining engagement of said diaphragm with the cable when said diaphragm is subjected to a higher pressure on that side remote from said end surface of said first end portion of said second gland part.

2. A cable gland according to claim 1 wherein said outer sleeve of said seal and said outer surface of said first end portion of said second gland part have co-operating formations for connecting said sealing means to said second gland part.

3. A cable gland according to claim 2 wherein said cooperating formations comprise an annular groove on one of said sleeve and said outer surface and an annular rib on the other of said sleeve and said outer surface.

4. A cable gland according to claim 1 wherein said seal support is positioned in said sleeve between said diaphragm and said end surface of said first end portion of said second gland part.

5. A cable gland according to claim 4 wherein said seal support comprises an annular plate separate from said seal.

6. A cable gland according to claim 5 wherein said annular plate and said end surface of said first end portion of said second gland part have co-operating formations for radially locating said annular plate.

7. A cable gland according to claim 6 wherein said cooperating formations comprise an annular recess in said end surface engaged by an axially disposed annular flange on said annular plate.

8. A cable gland according to claim 7 wherein said diaphragm defines a central aperture with an axially disposed lip for sealing around the cable and said annular plate defines a central hole coaxial with said central aperture through which the cable extends.

9. A cable gland according to claim 8 wherein said annular plate has a substantially flat outer portion in axially located engagement with said end surface of said first end portion of said second gland part and an inwardly extending inner portion defining said central hole.

10. A cable gland according to claim 9 wherein said inner portion is formed with radial slits defining a plurality of spaced apart flexible tongues for resiliently conforming said central hole to different cable sizes.

11. A cable gland according to claim 1 wherein said first gland part has a counterbore at said receiving end defining a radial abutment and said first end portion of said second gland part is received in said counterbore with said end surface axially spaced from said radial abutment.

12. A cable gland according to claim 11 wherein said diaphragm and said seal support are positioned between said abutment and said end surface of said first end portion of said second gland part.

13. A cable gland according to claim 11 wherein said outer sleeve of said seal terminates at said radial abutment of said counterbore of said first gland part.

14. A cable gland according to claim 1 wherein clamping means for clamping cable armour is provided, said clamping means comprising a pair of clamping members having opposed taper surfaces that are urged axially relative to each other when the gland is assembled for clamping cable armour.

15. A cable gland according to claim 14 wherein said opposed taper surfaces are urged axially by engagement of a hollow third gland part with said first gland part.

16. A cable gland according to claim 15 wherein one of said first and third gland parts has a cylindrical outer surface slidably and rotatably engaged by an external boot seal mounted on the other of said first and third gland parts for concealing a threaded connection between said first and third gland parts.

17. A cable gland according to claim 14 wherein one of said taper surfaces is provided by an axially disposed outer taper surface of a second end portion of said second gland part remote from said sealing means.

18. A cable gland according to claim 17 wherein the other of said taper surfaces is provided by an axially disposed inner surface of an annular clamping ring surrounding said second end notion of said second gland part.

19. A cable gland according to claim 18 wherein said clamping ring is reversible for presenting one of two oppositely inclined taper surfaces towards said outer taper surface of said second gland part for accommodating different thicknesses of cable armour.

20. A cable gland according to claim 1 wherein said seal is made of elastomeric material.

21. A cable gland according to claim 1 wherein said seal support is made of plastics material.

* * * * *